Dec. 9, 1969     J. A. RACITI     3,482,755
AUTOMATIC WAVE SOLDERING MACHINE
Filed Sept. 25, 1967     6 Sheets-Sheet 1
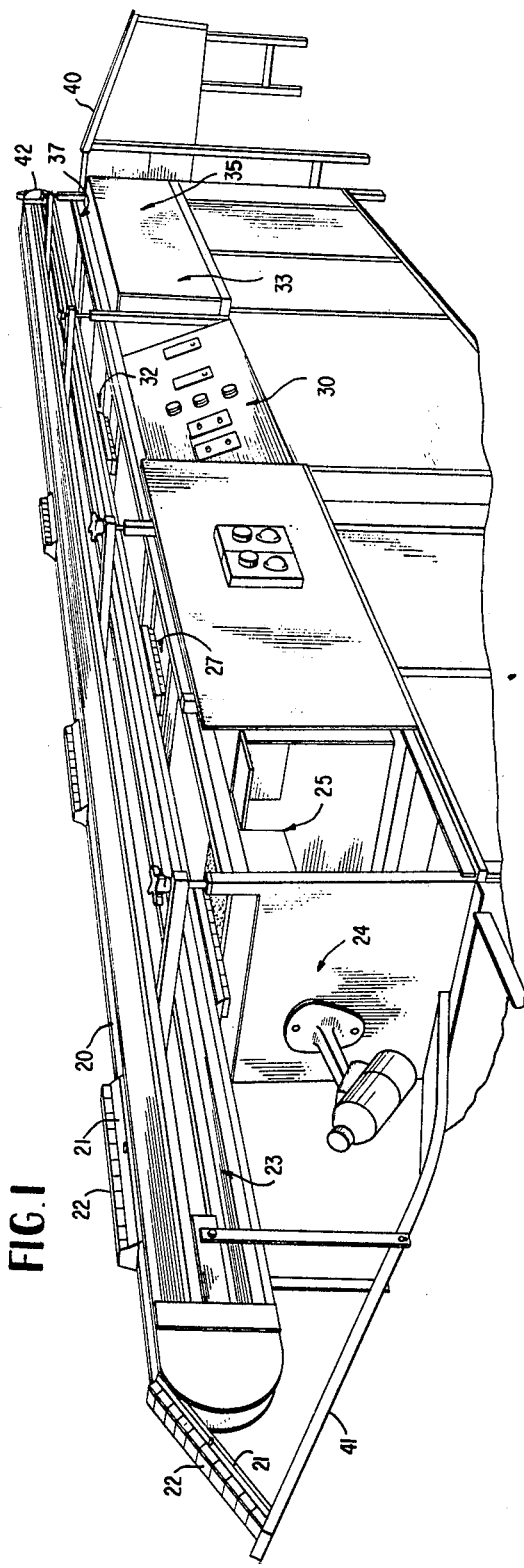
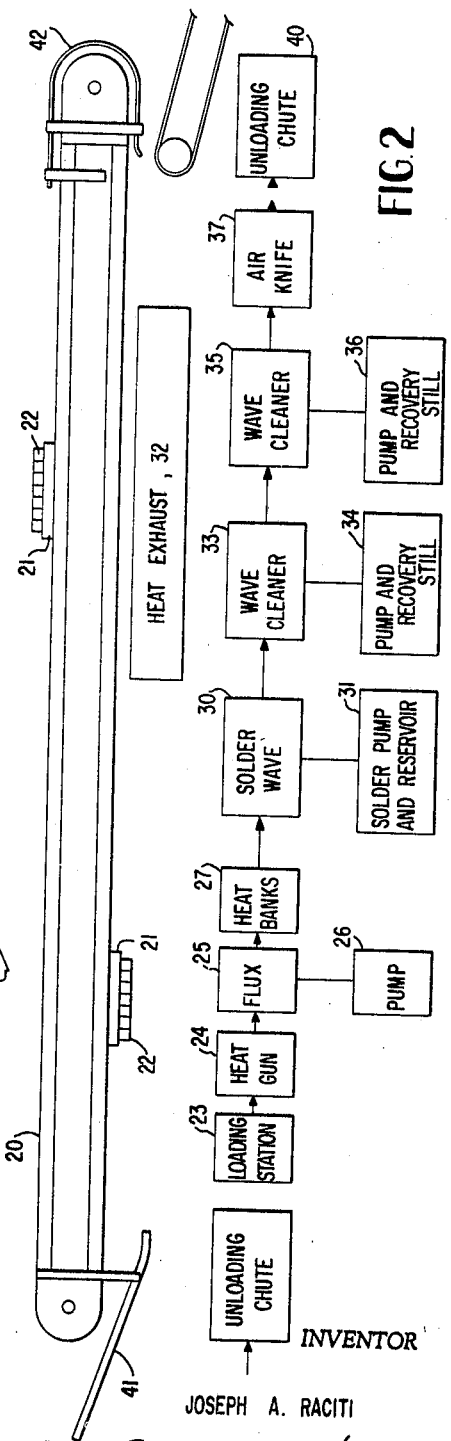
INVENTOR
JOSEPH A. RACITI
BY *Richard E. Hosley*
ATTORNEY Dec. 9, 1969   J. A. RACITI   3,482,755
AUTOMATIC WAVE SOLDERING MACHINE
Filed Sept. 25, 1967   6 Sheets-Sheet 2

INVENTOR
JOSEPH A. RACITI
BY *Richard E. Hesley*
ATTORNEY

INVENTOR
JOSEPH A. RACITI
BY Richard E Horsley
ATTORNEY

Dec. 9, 1969  J. A. RACITI  3,482,755
AUTOMATIC WAVE SOLDERING MACHINE
Filed Sept. 25, 1967  6 Sheets-Sheet 4
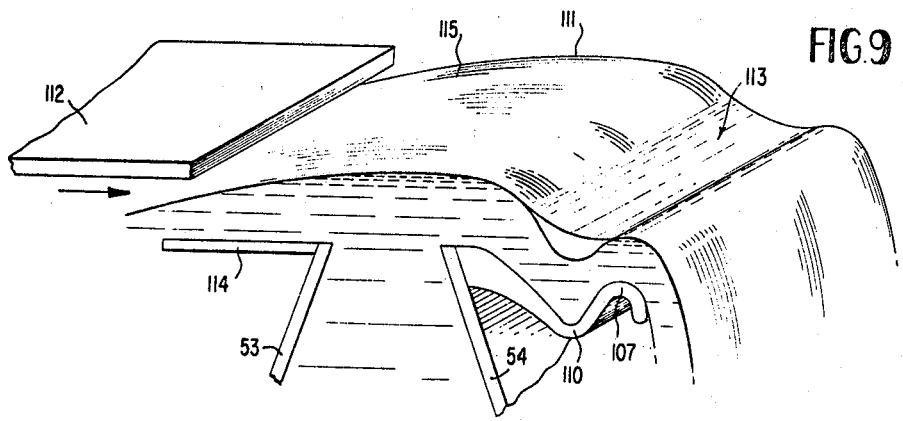
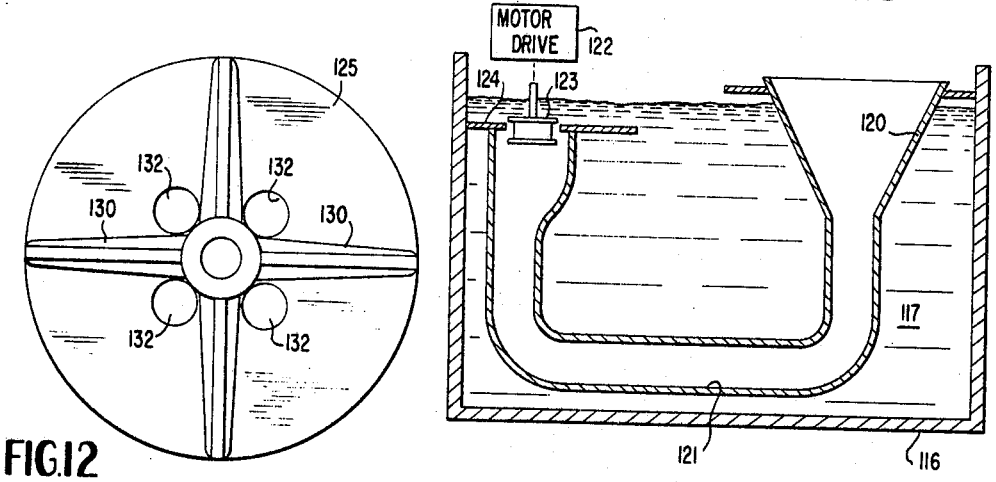
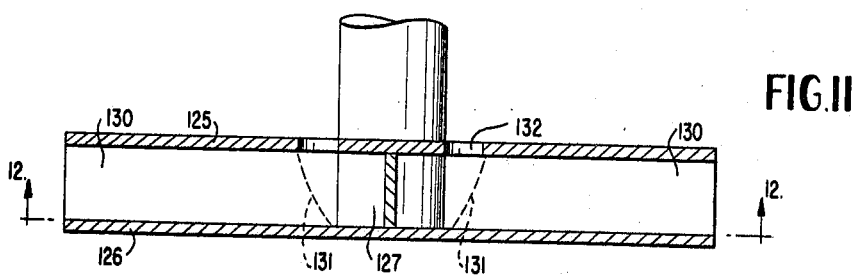
INVENTOR
JOSEPH A. RACITI
BY *Richard E. Horley*
ATTORNEY

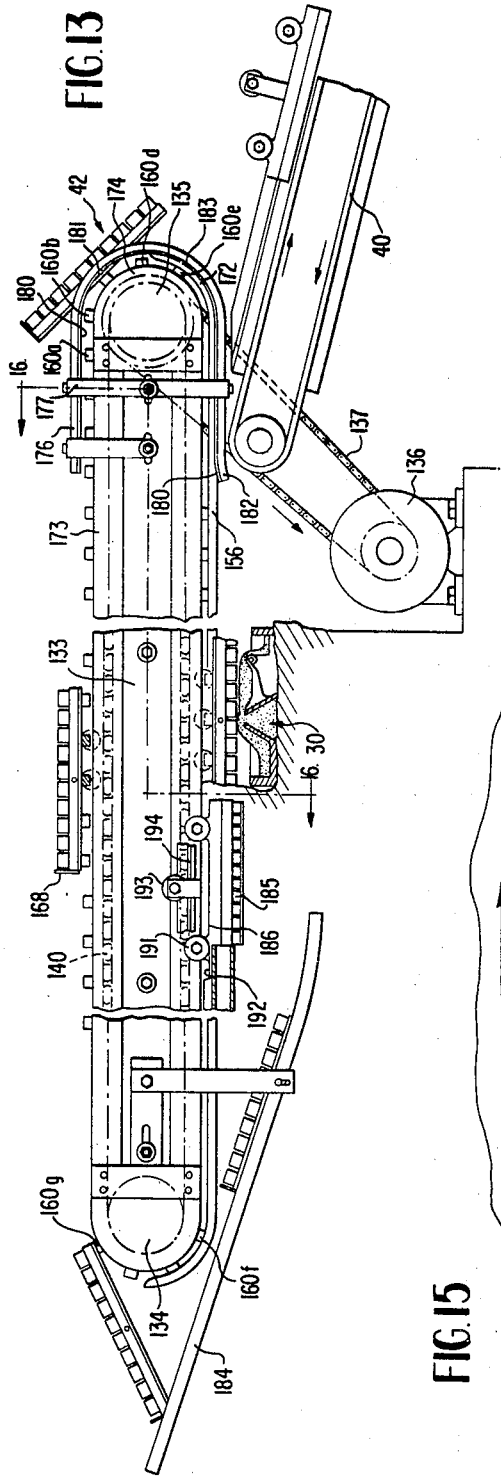

Dec. 9, 1969    J. A. RACITI    3,482,755
AUTOMATIC WAVE SOLDERING MACHINE
Filed Sept. 25, 1967    6 Sheets-Sheet 6

INVENTOR
JOSEPH A. RACITI
BY *Richard E. Hosley*
ATTORNEY 3,482,755
AUTOMATIC WAVE SOLDERING MACHINE
Joseph A. Raciti, East Boxford, Mass., assignor to General Electric Company, a corporation of New York
Continuation-in-part of application Ser. No. 606,772, Jan. 3, 1967. This application Sept. 25, 1967, Ser. No. 670,190
Int. Cl. H05k 3/34
U.S. Cl. 228—34       22 Claims

ABSTRACT OF THE DISCLOSURE

An automatic wave soldering machine. Soldering is produced in a turbulent or moving solder portion of a wave. Some molten solder from the turbulent wave portion is diverted by a wave drag plate to form a calm or drag solder pool portion which is contiguous to but lower than the moving wave crest. As a workpiece passes over the drag solder pool portion with portions of the workpiece in contact with the drag solder pool surface, solder bridges and icicles and excess solder are removed. Constant volume solder pumping means and conveyor means for accurately positioning the workpiece with reference to the solder wave permit exact placement of the workpiece as it passes the wave.

BACKGROUND OF THE INVENTION

This application is a continuation-in-part of an application filed Jan. 3, 1967, Ser. No. 606,772, assigned to the same assignee as the present application.

This invention is generally directed to soldering machines and more particularly to a wave soldering machine for providing improved solder connections.

In recent years the electronics industry has experienced several basic changes essentially involving the shift from vacuum tube concepts to solid state concepts. This shift has spurred efforts in other fields as a result of various considerations attendant with such solid state technology. One example of a new technology which has been born as a result of solid state technology and which takes advantage of the physically smaller size and the normally encountered reduction in heat dissipation is component packaging; and many new electronic packages have evolved as a result. The first package was the printed circuit board upon which each circuit component was connected. Then the concept of printed circuit board modules appeared wherein each package was designed to perform a single function, comprised a plurality of printed circuit boards and was affixed to a master board. Now the concepts of module stacking and integrated circuits are being developed. All of these developments have resulted in the production of circuits which perform the same functions as vacuum-tube counterparts but at a substantial production and maintenance cost savings. One factor which has permitted decreased costs is the use of mass soldering wherein a plurality of solder connections are made simultaneously as opposed to the single joint hand soldering commonly utilized with vacuum-tube circuits.

The first mass soldering approach was dip soldering; for example, a printed circuit board with the circuit elements mounted thereto was dipped into a molten solder pot. Although this overcame the time required to solder a plurality of connections, it was found that six problem areas existed which added expense to the process because there was considerable waste of solder and a requirement for careful inspection. Three of those areas were solder bridging, solder icicle formation, and solder buildup. Solder bridging occurred when solder spanned insulating spaces between adjacent conductors, thereby causing a short circuit. Solder icicles were generally formed as the circuit board was removed from the solder because the surface tension of the solder tended to cause molten solder to form a continuous path which was cooled as the printed circuit board was removed. Formation of solder icicles became extremely troublesome when a plurality of printed circuit boards, modules, or integrated circuits were placed in a stacked relationship as solder icicles also caused shorting. Finally, solder buildup at joints wasted solder and hampered visual inspection because solder joint quality could not be easily ascertained.

Other problems inherent with dip soldering processes have included dross formation, trapped gases, and heat damage. First, as the solder was relatively stagnant, dross would form on the molten solder surface, and such dross had to be removed prior to a dipping operation. If any gas were trapped after initial fluxing of the article to be soldered, voids in the solder connection would result, thereby producing mechanically weak and poor electrically conducting connections. Whenever the circuit components were kept in contact with the molten solder for a relatively long period of time, there was a danger that excessive exposure to heat would damage the components.

Therefore, the electronics industry embarked on finding another method for forming solder joints on printed circuit boards and other electrical components; and wave soldering wherein a workpiece was moved through a turbulent wave formed by pumping molten solder through a nozzle resulted. Throughout this discussion a turbulent wave refers to a wave wherein the solder surface is in motion. As such waves were turbulent, problems involving dross formation and trapped gases were substantially reduced. Furthermore, as the circuit component was moved through the turbulent wave with a relatively high velocity, overheating problems were substantially eliminated.

Solder bridging, solder icicle formation, and solder buildup were still present in the wave soldering machines known in the prior art; and several attempts were made to overcome this problem. Such improvements have taken the form of solder wave extenders, the addition of oil films or the use of multiple waves. In spite of the improvements which have been made in the prior art, close inspection of the finished circuit connections is still required, and in many instances the reject rate is substantial.

It is an object of this invention to provide a means and method for soldering whereby rejection of soldered articles is substantially reduced.

It is another object of this invention to provide a means and method for soldering which substantially eliminates solder bridging.

Still another object of this invention is to provide a means and method for soldering which substantially eliminates the formation of solder icicles.

Yet another object of this invention is to provide a means and method for soldering which provides solder connections with a substantial decrease in solder buildup.

SUMMARY

In essence, soldering in accordance with this invention is accomplished by subjecting a workpiece to be soldered to a turbulent portion of a solder wave and passing the workpiece over a contiguous drag solder pool surface so that portions of the workpiece contact the drag solder pool surface. This invention can be incorporated in a wave soldering machine by altering the flow of some solder which forms the turbulent portion to provide a solder flow pattern which produces the drag solder pool. As the workpiece leaves the turbulent solder portion and moves over the drag solder pool surface, solder icicles, solder bridges and excess solder are removed.

This invention has been pointed out with particularity in the appended claims. A more thorough understanding of the above objects and advantages can be obtained and may be better understood by reference to the following detailed description taken in conjunction with the appended drawings.

BRIEF DESCRIPTION OF THE DRAWINGS

FIGURE 1 illustrates a soldering machine in perspective;

FIGURE 2 is a schematic diagram of the operations performed by the soldering machine shown in FIGURE 1;

FIGURE 9 depicts yet another embodiment of a wave adapter;

FIGURE 10 schematically illustrates a wave solder pump which is adapted for use with this invention;

FIGURE 11 illustrates a detailed view of an impeller used in such a solder pump;

FIGURE 12 is a sectional view taken along the lines 12—12 in FIGURE 11;

FIGURE 13 presents details of means used to transport work in the wave soldering machine;

FIGURES 14, 15, and 16 illustrate further details of the transport means shown in FIGURE 13; and FIGURE 17 is a perspective view of a cleaning station adapted for use with this invention.

DESCRIPTION OF THE PREFERRED EMBODIMENTS

Figure 3:
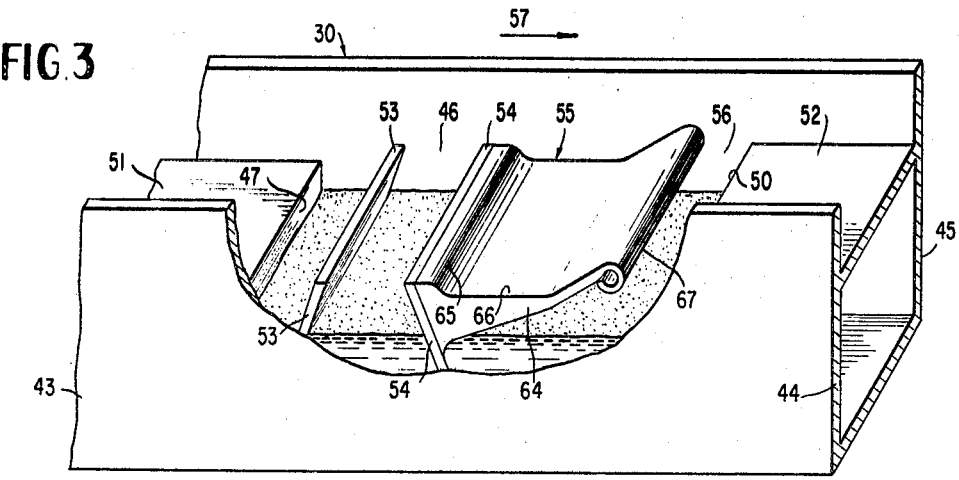
FIGURE 3 illustrates a wave adapter structure used to modify the solder wave form for wave soldering in accordance with this invention.

Referring to FIGURES 1 and 2 together and utilizing like numbers to designate like functions throughout the remaining discussion, there is a conveyor 20 to which carriers 21 are mounted, the carriers 21 having modules 22 affixed thereto and being connected to the conveyor 20 at a loading station 23. The conveyor 20 then carries the modules 22 past the various stations of the soldering machine at a constant level. The structure providing this function is discussed in more detail hereinafter.

The first station that the modules 22 reach is the heat gun station 24 where the circuit board temperature is raised to a constant, controlled temperature which is slightly above ambient. For example, if the ambient temperature is 70° F., a board temperature prior to fluxing of 80° F. is satisfactory. From the heat gun station 24, the modules 22 are carried to a flux station 25 where foam flux is applied to the modules 22. By having raised the circuit board temperature at the heat gun station 24, bubbles formed in the foam are dispersed by changing the foam to a liquid. In addition, the heating of the board allows the foam flux to disperse over contaminants to improve solderability. If higher temperatures were used, the foamed flux would be converted to a liquid before it reached the modules 22, and no fluxing would occur. Flux is supplied from a standard flux pump 26, and adjustment of the foam height is controlled by raising or lowering the flux station 25 and flux pump 26 relative to the conveyor 20 so that the carriers 21 move in a straight line across the machine.

After being fluxed, the modules 22 and the carrier 21 pass over a series of heat banks 27 to dry all the flux on the board and to bring the board temperature to about 250° F. so that thermal shock is minimized. Two heat banks may be associated with this type of machine. A first bank heats one-sided boards or boards without plated through holes or V-slots. Such a heat bank can be constituted by a hot air device which drives flux out of the holes. A second heat bank can be constituted by a hot plate which provides heat to induce better capillary action in plated through holes. After being preheated by the heat banks 27, the carrier 21 and modules 22 pass by the solder wave station 30. Solder for the solder wave station 30 is supplied from a solder pump and reservoir station 31. Details of the solder wave station 30 and the solder pump and reservoir station 31 are discussed hereinafter.

After the modules 22 are soldered, the carrier 21 passes a heat exhaust station 32 between the solder wave station 30 and a first wave cleaner station 33. This heat exhaust station is constituted by a controllable exhaust system disposed beside the conveyor 20 so that thermal shock, which would otherwise be caused when the modules 22 entered the first wave cleaner station 33, is minimized. The effect which is noted by using such a heat exhaust system is that the solder joint tends to remain shiny rather than dulling as was true in the prior art. Dulling was disadvantageous because a dullness may also indicate a cold or ineffective solder joint.

Associated with the wave cleaner station 33 is a pump and recovery still station 34. This wave cleaner station 33 removes flux from the circuit board and uses the recovery still to reclaim the solvent. A wave expander is used on the first wave cleaner to extend the wave in the direction of carrier travel for soaking any stubborn flux which remains on the board. A brush may be mounted at the end of the expanded wave to aid in the loosening and removing of any stubborn flux as discussed hereinafter.

A second wave cleaner station 35 and pump and recovery still station 36 provide a final solvent rinse. This solvent is maintained at a temperature of between 80° and 90° F. to reduce solvent evaporation and improve drainage back to the solvent chamber. As was true with the first wave cleaner station 33, this wave cleaner station may also include a wave extender and a brush. Following the second cleaning operation, the printed circuit boards pass an air knife or air blast station 37 which removes any solvent residue and cools the board. Utilizing an air knife restores brightness which may have been lost in the prior operations.

Depending on the type of board which is being soldered, one of two alternate operations will then occur. If wide boards, which are not mounted directly to the carrier 21 or the conveyor 20, are being soldered, they are offloaded at an unloading chute 40. Boards on the carrier 21 are returned to an unloading chute 41 by the conveyor 20 after traversing a reversing fixture 42 the details of which are shown hereinafter.

SOLDER WAVE

Figure 4:
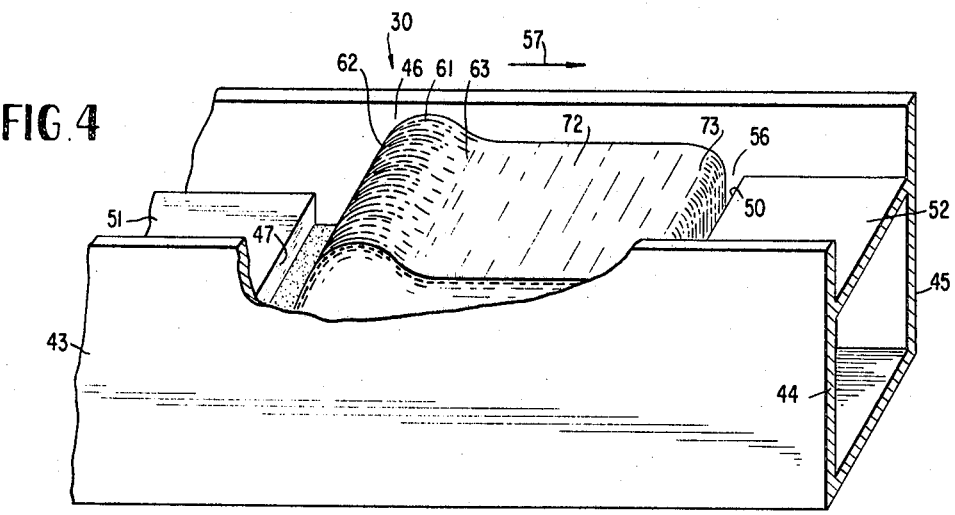
FIGURE 4 shows the wave form produced by the wave adapter illustrated in FIGURE 3.

FIGURES 3 and 4 illustrate a typical solder wave station 30 which is formed in a framework 43 constituted by two parallel, vertical sidewalls 44 and 45. A solder well 46 is formed by the sidewalls 44 and 45, walls 47 and 50 which terminate at top portions 51 and 52, respectively, and a bottom portion which is not shown. The top portions 51 and 52 lie in a plane which is lower than the molten solder surfaces formed by the plates 53 and 54 and a wave drag plate 55 but at a level higher than the highest solder level of the molten solder in a reservoir 56. Whereas FIGURE 3 illustrates the solder wave station 30 with the solder pump inactivated, FIGURE 4 illustrates the position of the solder wave during operation of the pump. The work travels in a direction designated by the arrow 57 past the solder wave.

Figure 5:
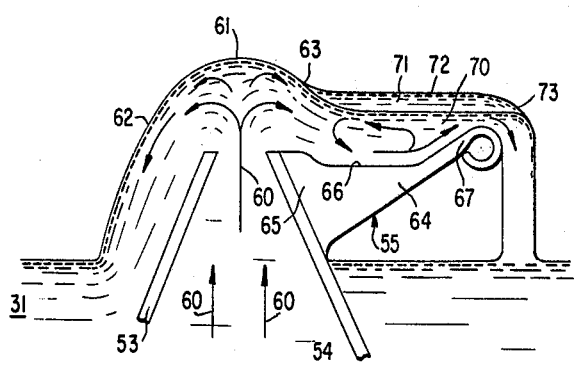
FIGURE 5 is a cross-sectional view showing flow paths within the wave produced by the adapter illustrated in FIGURE 3.

The exact manner in which the wave is formed is shown in detail in FIGURE 5. The plates 53 and 54 converge to form a nozzle means. Solder is discharged from the solder pump and reservoir station 31 into the converging plates 53 and 54 at the wide opening thereof to cause a flow indicated by the arrows 60. When the molten solder is discharged from the opening of the nozzle means, the flow pattern creates a constant level wave crest 61 wherein the molten solder surface adjacent the wave crest 61 is turbulent.

A portion 62 falls back to the solder in the solder pump and reservoir station 31 in a direction which is opposite the motion of the workpiece. Another portion of the solder wave, designated as a forward portion 63, generally moves in the same direction as the workpiece, but its flow pattern is altered by the wave drag plate 55 having a body portion 64, a first lip portion 65, a recessed horizontal central portion 66, and a second, rounded and closed lip portion 67, the lip and control portions forming a continuous, smoothly varying flow surface. The wave drag plate 55 is affixed to the plate 54 so that the first lip portion 65 is contiguous to the discharge opening of the nozzle means. Therefore, the forward portion 63 of the molten solder is directed along the surface of the first lip portion 65 and across the central portion 66 to the second lip portion 67, After traversing the wave drag plate 55, the molten solder drops back to the solder reservoir.

As molten solder is initially pumped through the nozzle means, molten solder from the forward portion 63 flows along the first lip portion 65, the central portion 66 and over the second lip portion 67. However, as the flow continues and stabilizes at a particular flow rate, the change in solder velocity over the second lip portion 67 apparently causes a portion of the solder to undergo a flow reversal, thereby producing an eddy flow under the solder surface. It is thought that this eddy flow causes two molten solder strata to form above the central portion. A lower stratum 70 of solder moves generally in a direction indicated by the arrows 60 whereas an upper molten solder startum 71 is generally inert or calm. The wave drag plate 55 therefore produces a solder table having a relatively calm surface 72 which extends from the first wave to an area generally above the second lip portion 67 designated by numeral 73. Hence, the wave drag plate 55 produces a turbulent solder portion and a contiguous calm solder surface portion 72, the latter acting as a drag solder pool. In one embodiment of this invention, the flow rate is set to provide solder flow so that the workpiece clears the nozzle means and so that the turbulent wave crest 61 is slightly compressed by contact with the workpiece. The wave drag plate 55 is formed and located to provide a drag solder pool surface which, in preferred embodiments, would contact the bottom surface of the conductors extending through the workpiece. Further, the flow rate should cause the surface of the wave to have two characteristics. First, the surface of the wave portion 62 is relatively smooth across its width; second, the surface of the portion 62 is in motion. In any machine the shape of the particular wave drag plate and the solder flow rate will be interdependent so that exact settings cannot be given. They are determined empirically.

Figure 6:
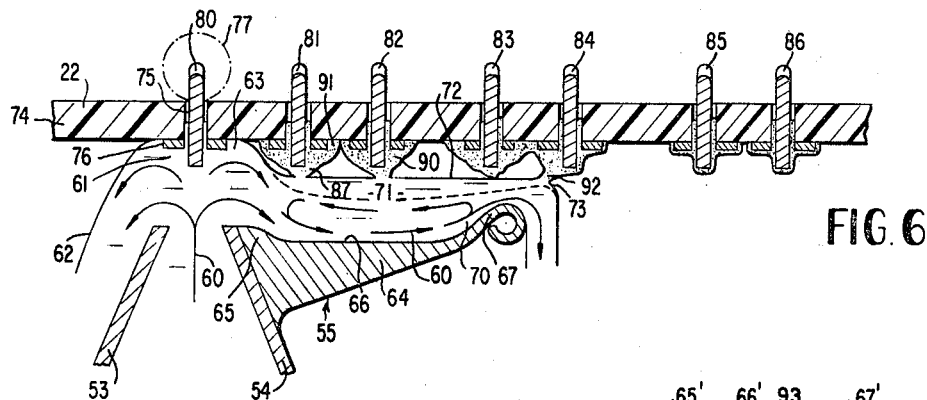
FIGURE 6 is a pictorial analysis of the various steps taken as a printed circuit board is soldered by a soldering machine formed in accordance with this invention.

Before explaining how the solder wave produced by the mechanism shown in FIGURES 3 through 5 produces the desired advantages and accomplished the objects enumerated above, reference is made to FIGURE 6 which illustrates, in an enlaged cross-sectional view, a circuit module 22 constituted by an insulating board 74 having a plurality of through holes or apertures 75. Portions of the insulating board have conductive eyes 76 adjacent each aperture which form part of the printed circuit on the module. Components, one of which is shown in phantom and designated by numeral 77, are coupled to the printed circuits by means of leads 80 through 86 which individually extend through the apertures 75 and which are soldered to the conductive eyes 76. By referring to leads 80 through 86 in sequence, it is possible to understand how this particular wave shape provides the improved results. This discussion is limited to one-sided boards; however, it will be shown hereinafter how this wave soldering machine can be adapted to provide soldering for other soldering operations while retaining all the improved results provided by this invention.

The operation is shown without illustrating the carrier 21 as the operation of the carrier is discussed in conjunction with the discussion of the conveyor 20. However, the carrier 21 does contain means to wipe any dross which may form on the drag solder surface 72 after extended periods of nonuse.

As the printed circuit board 22 and the conductors pass through the wave crest 61 to slightly compress the wave, turbulence causes solder to move up the aperture 75 along a conductor 80. As the conductor is removed from the crest 61, as illustrated by conductors 81 and 82, a solder icicle 87 and excessive solder portions 90 tend to form. If there is enough solder on the conductors 81 and 82, a solder bridge 91 may also tend to form, thereby causing the conductors 81 and 82 to be short-circuited.

During the time interval the workpiece moves to the right so that the conductors 81 and 82 move to the position illustrated by the conductors 83 and 84, solder icicles such as the solder icicle 87 melt and the temperature of the solder is raised. In the particular embodiment shown, the surface of the drag solder pool is positioned slightly below the bottoms of the conductors to contact the solder. This arrangement is shown primarily to illustrate the action of the drag solder pool on the workpiece for maximum clarity. In a preferred embodiment, the surface of the drag solder pool would be located to just touch the conductor end surfaces. This preferred approach can be attained in most processes because the conductors are usually cut to extend a uniform distance through a printed circuit board. As the printed circuit board 22 approaches the position illustrated by the conrructors 83 and 84, portions of the solder constituting the icicle 87 reach a temperature whereupon those portions become molten and either drop back into the upper solder stratum 71 or flow upwardly to increase the amount of solder at the connection.

As the connection then moved further to the right as illustrated by the conductors 83 and 84, the remaining solder which forms the solder buildup 90 and the solder bridge 91 becomes molten and tends to raise the surface of the solder pool through surface tension and pull it beyond the point 73. Therefore, as the printed circuit board 22 moves past the point 73, the excess molten solder is pulled back to the solder wave as shown by a solder string portion designated 92. As the excess solder is drawn off, both the excess solder portions 90 and the solder bridges 91 are eliminated. The result is shown by the conductors 95 and 96 wherein the outline of the finished solder connection approaches that of the conductor.

Hence, it can be seen that by utilizing a wave form in accordance with this invention, the problems of solder icicles, solder bridging, and excess solder are overcome. Although the drawings illustrate the components of the circuit in exaggerated dimensional detail, a soldering machine formed as illustrated in FIGURE 6 has been used to solder a printed circuit board having conductors of 15 mils width spaced by 15 mils without solder bridging or icicle formation. It has been found that the reject rate of printed circuit boards is greatly reduced. In addition, it is possible to increase the speed at which the circuit modules 22 pass the wave form so that the capacity of a given machine is increased. Still another advantage results when the speed is increased; the temperature of the solder can be increased to promote more reliable solder connections without danger of damaging the components mounted on the circuit board.

WAVE ADAPTERS

The wave drag plate 55 illustrated in FIGURES 3 through 6 has no means of adjustment or variation. While such a plate is adequate when automatic soldering machines are designed for a single function, it may be inadequate when different functions are required. The following discussion is directed to some examples of variable wave drag plates which increase machine flexibility without altering the improved results obtained through this invention.

Figure 7:
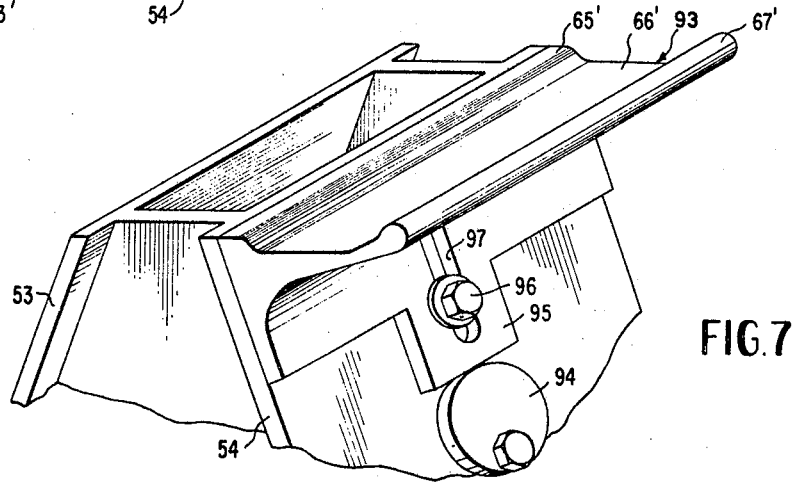
FIGURE 7 presents a perspective view of an adjustable wave adapter.

FIGURE 7 illustrates how an adjustable wave drag plate can be constructed to provide movement of the entire table. The wave drag plate 93 has fixed first and second lip portions 65' and 67' and a fixed central portion 66'. To provide compensation when variations in wave height are necessary, wave drag plate elevation control means are provided. An example of such a control means is shown in FIGURE 7 wherein a cam 94 engages a tab 95 formed integrally with the wave drag plate 93. Locking means comprising a bolt 96 which extends through a slot 97 in the tab 95 to a threaded opening in the plate 54 serves to lock the wave drag plate 93 after it is properly positioned.

Rotation of cam 94 causes the position of the wave drag plate 93 to be altered with reference to the plates 53 and 54. This provides control of the relative position of the drag solder pool surface with respect to the turbulent solder wave crest.

Figure 8:
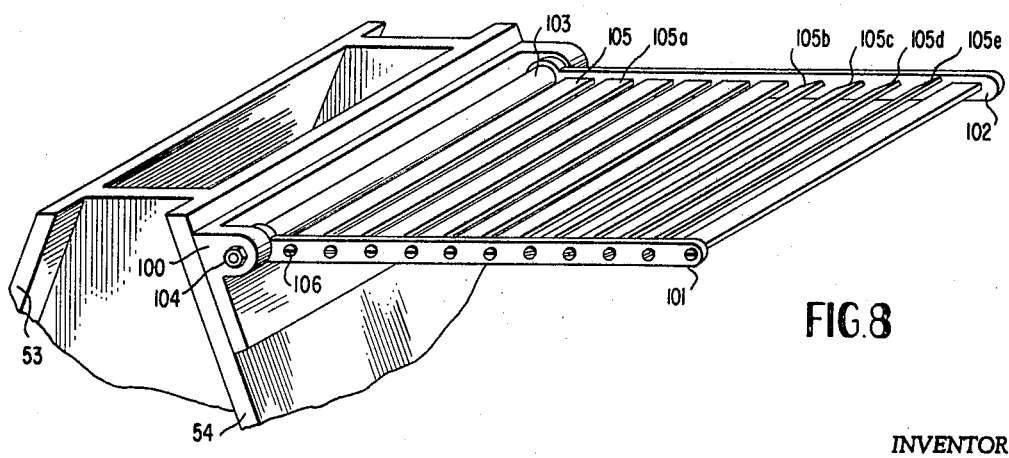
FIGURE 8 illustrates still another embodiment of an adjustable wave adapter.

A more universal wave drag plate is shown in FIGURE 8. A bracket 100 is affixed to the plate 54. Although not shown herein, an elevation control similar to that shown in FIGURE 6 can be used to allow the entire assembly position to be changed relative to the plate 54. This arrangement provides the same adjustment as given by the structure in FIGURE 6. However, by utilizing this universal wave drag plate, two additional adjustments are available.

The wave drag plate comprises a pair of parallel spaced support arms 101 and 102 which are hinged to the bracket 100 by means of a shaft 103. Locking means, such as a locking bolt 104, maintain the support arms 101 and 102 in their fixed parallel relationship. Parallel transverse slats 105 span the support arms 101 and 102 and are rotatably mounted thereto by means known in the art. Kerfed bolts 106 extending through the support arm 101 to each slat 105 provide a means for rotating each slat 105 about its longitudinal axis and locking the slats in position. Adjacent slats are closely spaced with minimum spacing limited only by that required to permit rotation of adjacent slats. Other dimensions are primarily controlled by the maximum spacing which does not allow a loss of solder through the spaces between adjacent slats.

If all the slats were in the same position as slat 105a, this wave drag plate would merely extend the forward wave portion 63 shown in FIGURES 4 through 6. However, as individual slats, such as slats 105b, 105c, 105d, and 105e, are rotated about their respective axes, a change in the velocity of the solder occurs. When properly oriented in a manner similar to that shown in FIGURE 8, a calm solder surface is produced. By varying the angular position of the individual slats 105, the height of the drag solder pool surface can be varied to fine tolerances as if the solder moved on the surface of a tractable material. Angular rotation of the arms 101 and 102 about the axis through the shaft 103 provides a variation of the position at which the solder is peeled from the printed circuit board by a solder string, such as string 92 shown in FIGURE 6. In addition, a course adjustment in the height of the entire solder wave is made by an elevation control system associated with the bracket 100 and by varying the speed of the solder pump.

When printed circuit boards having plated through holes are to be soldered, a wave drag plate such as that shown in FIGURE 9 can be used. Construction is the same as that shown in FIGURES 3 through 6 except that the changes in the surfaces are more severe although a continuous, smoothly varying flow surface is still present. The second lip portion 107 is lower than that illustrated in FIGURES 3 through 6, and the depressed central portion 110 is narrower and deeper. A wave 111 is adjusted to a height which is above the bottom surface 112 of the printed circuit board to be soldered so that the printed circuit board comprises the wave 111 as it passes the solder station. This produces an enlarged "wetting drag" area 113. Even better results are obtained if a forward wave extender 114 is placed on the plate 53 to preheat the board and conductors. This modification produces better solderability with this type of board because increased time over this extended portion 115 permits more solder to be forced through the apertures in the printed circuit board by the turbulent wave. The subsequent "wetting drag" area 113, which includes the drag solder pool, serves to increase the temperature of the printed circuit board and the component leads so that even better wetting of the conductive coatings and the component leads occurs. When the board leaves the "wetting drag" area 113, the solder on the board is still molten as a result of this increased temperature, and again solder bridging and icicles and excess solder are removed in accordance with this invention.

When any of the wave drag plates illustrated and described above are used in a wave soldering machine, there are two parameters which are important to successful soldering. First, the crest of the turbulent solder portion should be held at a constant level. In addition, the bottom surface of the printed circuit board being soldered should be maintained in a single plane, the plane remaining fixed relative to the solder wave.

SOLDER PUMP

To fulfill the requirement that the wave crest have a constant height, it is necessary to modify a standard impeller-type solder pump as illustrated in FIGURES 10 through 12. In the particular embodiment illustrated in FIGURE 10, a tank 116 contains molten solder 117 which is discharged through a nozzle means 120 to form the solder wave. Molten solder is supplied through a conduit 121 by means of an impeller pump driven by a constant speed motor drive 122. An impeller 123, constructed in accordance with this invention, is located in an aperture formed in a submerged plate 124. As the impeller 123 radially discharges molten solder, the quantity of molten solder pumped into the conduit 121 is controlled by the position of the impeller 123 with respect to the plate 124. As the impeller is raised, a greater percentage of the molten solder is discharged into the reservoir and less of the molten solder is discharged into the conduit 121.

In prior art impeller pumps, the wave height decreased with time during prolonged use. The major cause for this decreasing height was found to be a build-up of oxide adjacent the apexes formed by the impeller vanes near the center of the impeller. For example, in the impeller shown in FIGURES 11 and 12, the volume defined by plates 125 and 126, a center body 127 from which the impeller vanes 130 extend, and dashed lines 131 normally becomes filled with the oxide. This produces a decrease in the impeller pumping volume and therefore the quantity of solder pumped.

To eliminate oxide accumulation at the apexes, apertures 132 are bored through the upper plate 125 near each apex formed by adjacent vanes 130. As the oxides are lighter than the molten solder, they move through the apertures 132 to the molten solder in the reservoir above the plate 124.

Therefore, by modifying the impeller and mounting it for vertical adjustment, the solder quantity pumped through the conduit 121 to the nozzle means 120 is constant for a sustained pump speed and stationary vertical position. This permits the conveyor system to be fixed with minor adjustment of the relative positions of the solder wave and workpiece to be soldered accomplished by changing the vertical position of the impeller 123.

CONVEYOR

The second requirement for good soldering in accordance with a preferred embodiment of this invention is that the relative positions of the printed circuit assembly and the wave remain constant. As the wave height is kept constant by the improved pumping means, the constant position relationship between the wave and the workpiece can be maintained by the conveyor system illustrated in FIGURES 13 through 16.

FIGURE 13 presents a detailed view of the entire assembly to show all the conveyor functions. The conveyor includes a frame assembly 133 which is supported on a stand which additionally supports all other wave soldering machine elements. Mounted on the frame 133 at the opposite ends thereof are a pair of sprockets 134 and 135, sprocket 135 being driven by a motor 136 coupled thereto by a chain 137. It will be obvious to those skilled in the art that any means may be used to cause a conveyor chain 140 to be driven in an elongated path between the sprockets 134 and 135.

Figure 14:
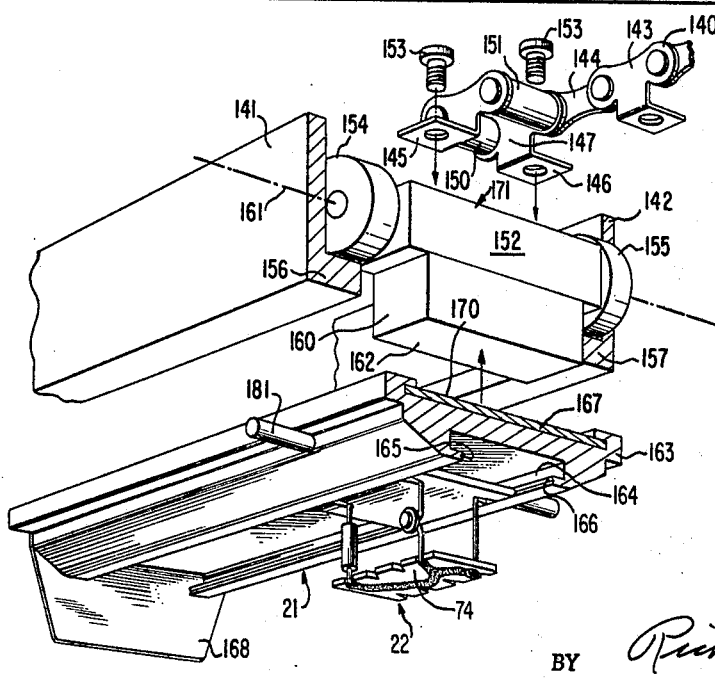

Referring specifically to FIGURE 14, a first pair of horizontal tracks constituted by track 141 and track 142 are mounted to the lower portion of the frame assembly. The conveyor chain 140 is a modified standard link arrangement comprising links 143 and 144, but predetermined equidistantly spaced have tabs 145 and 146 formed thereon so that certain links, for example link 147 with the tabs 145 and 146, are pivotal with respect to the link 144 and an adjacent link. Cross members 150 and 151 serve to define spaces therebetween and are engaged by teeth on sprockets 134 and 135. Mounted to the tabs 145 and 146 is a mounting block 152 by means such as bolts 153. The block 152, composed of a nonmagnetic material, includes wheels 154 and 155 mounted on the ends thereof. These wheels roll along horizontal portions 156 and 157 of tracks 141 and 142, respectively, and carry the block 152 past the various soldering machine stations. A permanent magnet 160 is mounted below the block 152, and the carrier 21 is affixed thereto. Accuracy is maintained in part by forming the wheels 154 and 155 of a synthetic high-wear material. The distance from the axis of rotation designated by numeral 161 to a loading surface 162 on the permanent magnet 160 is held to close tolerances. If the bearing surfaces on the horizontal track portions 156 and 157 define a single plane, the bottom surfaces 162 of permanent magnets also move, individually and collectively, in a single plane because the entire weight of the chain and the magnets is suspended from the wheels.

Smaller modules are mounted to a carrier 21 which, as shown in FIGURE 14, comprises a body portion 163 having a longitudinally extending slot 164 and a pair of oppositely disposed slots 165 and 166 formed to support printed circuit assemblies across the opening defined by the slot 164. Mounted on the side of the body 161 opposite the slot 164 is a plate of a magnetic material. This plate 167 is supported by the body portion so that the distance from the upper surface 170 of the plate 167 to a reference plane defined by the slots 165 and 166 is constant. If the printed circuit modules 22 inserted in the slots 165 and 166 are constructed to close tolerances, then the distance from the upper plate surface 170 to the surface of the printed circuit module which contacts the solder wave also remains substantially constant. Therefore, the position of the surface to be soldered remains constant as it is moved through the wave soldering station by the conveyor 20.

To remove dross which may form on the drag solder pool surface, a dross removing means can be attached to the carriers 21. For example, a Teflon wiper 168 can be mounted to a leading edge of the carrier 21 as shown in the figures so that it terminates at a level which permits dross to be removed.

Problems introduced in prior art conveyor systems by slack in the conveyor chain or belt are eliminated as shown in FIGURE 15. The position of a dolly 171, constituted by the mounting block 152, the wheels 154 and 155, and the permanent magnet 162, is determined primarily by the locations of the tracks 141 and 142. Each dolly has two pivotal axes. One is constituted by the axis of rotation 161 shown in FIGURE 14. The dolly assembly can also pivot with an individual link 147 to which it is mounted relative to other links in the conveyor chain. However, as the entire weight of dolly 171 depends from the wheels and track, slack in the conveyor chain 140 tends to be taken up by the relative pivotal motion between adjacent links in the chain rather than pivotal motion of the dolly 171. This is especially true if a carrier 21 is mounted to the permanent magnet 160 as such a carrier normally spans more than two adjacent dollies 171 and thereby tends to limit pivotal motion of the dolly 171. Hence, problems in the prior art caused by slack in conveyor belts have been eliminated by this double pivotal motion, or knee action, and the printed circuit board moves past the wave soldering station in the plane determined solely by the plane of the supporting tracks 141 and 142 and independently of the condition of the conveyor chain 140.

As this wave soldering machine may be used to solder pirnted circuit modules such as that described in the Patent 3,304,468 issued to Alfred C. Lawson, on Feb. 14, 1967, and assigned to the same assignee as the present invention, it is desirable to return such modules to the loading operator where additional operations may be performed. For example, after a soldering operation, it is often desirable to solder the other side of the printed circuit module.

Figure 16:
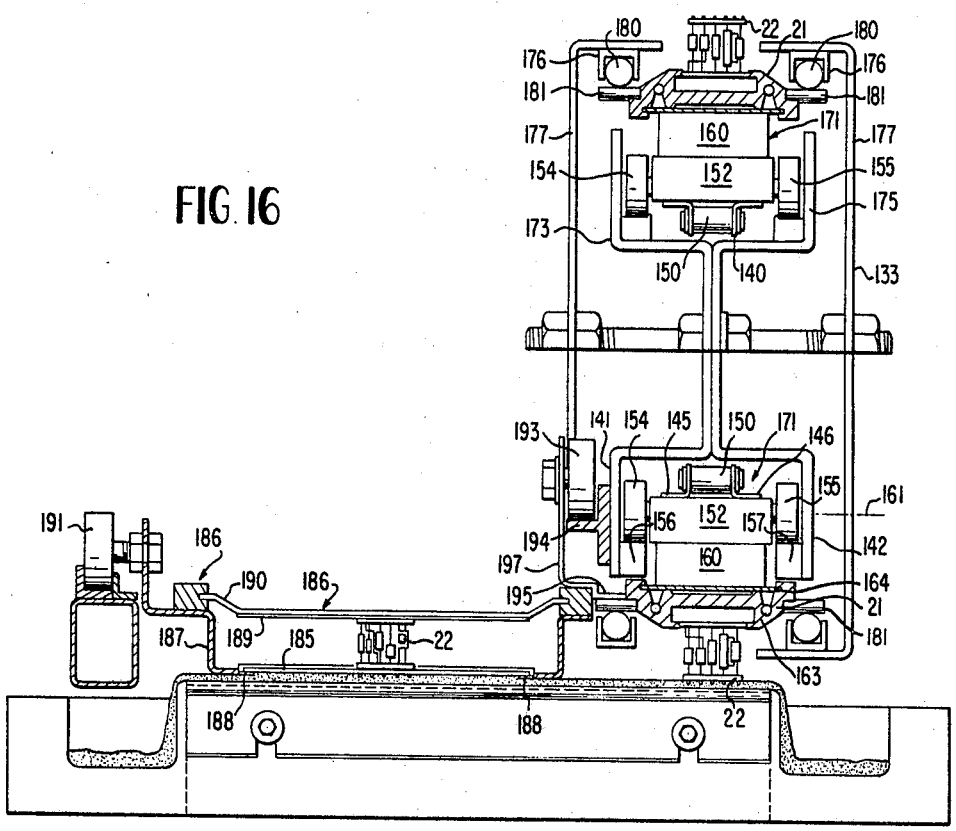

By utilizing the magnetic conveyor system as described herein, it is possible to simply and effectively return the printed circuit module to the loading station or adjacent thereto without the requirement for complex mechanical linkage. Turn-around adjacent the sprocket 135 can be understood by reference to FIGURES 13 and 16. The lower tracks 156 and 157 extend horizontally to a position vertically below the center of sprocket 135; thereafter an arcuate track portion 172 of the track 156 and another similar portion for the track 157 extend for approximately 90° concentrically with the sprocket 135. An upper track portion 173 similarly extends generally horizontally to a position vertically above the center of the sprocket 135, whereupon it is formed to constitute an arcuate portion 172 also concentric with the sprocket 135 but inside the arcuate track portion 172. The difference in the radii defining these arcuate portions equals the diameter of one of the dolly wheels. Another upper track 175 shown in FIGURE 16 is associated with the lower track 157 and is identical with the upper track 173. As the upper and lower tracks are coextensive over a portion of the arc, transfer of the dolly 171 from the lower track to the upper track is readily effected.

To aid in the turn-around, guide members 176 are mounted to the frame by brackets 177. These guide members are generally concentric with the arcuate portions of the track and parallel to the horizontal track portions. Teflon strips 180, trapped in the guide members 176 at a distance from the tracks such that a pin 181 attached to the carrier 21 shown in FIGURES 14 and 16, rides along the Teflon coating.

As the carrier 21 with printed circuit modules 22 attached thereto approaches the drive sprocket end of the conveyor, the carrier 21 tends to move in a straight line. When pins 181 pass an end portion 182 of the guide member 176, they engage the Teflon strips 180. Thereafter, the conveyor 20 displaces the carrier 21 horizontally, and certain leading magnets, perhaps magnets 160a and 160b, disengage from the metal plate 167 until the pins 181 reach an arcuate portion 183 on the guide 176. Coaction between the forces caused by the conveyor 20 attempting to move the carrier 21 horizontally and caused by the interference between the pins 181 and the arcuate guide member portion 183 may result in the separation of the magnets 160d and 160e from the plate 167 so that only the magnet 160c holds the carrier 21 in a generally tangential plane relative to the arcuate portion of the guide member 176 and the drive sprocket 135. The exact action which will occur depends upon the location of the carrier 21. However, in all cases the result is that a single magnet supports the carrier 21 during this stage. As the carrier 21 approaches a horizontal position adjacent the upper tracks 173 and 175, it may then re-engage first with the magnets 160a and 160b and then with the magnets 160d and 160e to be carried to the other end of the conveyor in an inverted position.

Automatic off-loading of carriers 21 occurs adjacent the sprocket 134 in this arrangement. The unloading chute 41 comprises a ramp 184 which is located in close proximity to the sprocket 134 and extends beyond the end of the soldering machine. As the conveyor 20 moves the inverted carrier 21 to the left, a first magnet 160f will be pulled from the plate 167. The carrier 21 remains substantially horizontal and continues to move to the left as successive magnets are also pulled from the plate 167. This occurs because no guide member is used to interfere with the motion of the carrier 21. As shown in FIGURE 13, only a single magnet such as the magnet 160g finally contacts the plate 167; at this point the carrier 21 tilts downward until the leading edge thereof contacts the unloading chute 184.

Thereafter the magnet 160g moves the trailing edge of the carrier 21 downward and to the left while the leading edge moves up the ramp 184. Eventually the magnet 160g peels off plate 167 and the carrier drops to the ramp 184 and then slides down to a position adjacent the loading station 23.

Modules 22 may also be mounted on a larger printed circuit board such as circuit board 185 shown in FIGURES 13 and 16. Usually, such an assembly cannot be mounted to a carrier 21; however, by using a carrier 186, it is possible to accommodate such printed circuit assemblies.

The carrier 186 comprises a frame 187 including accurately located means for supporting the printed circuit board such as a lip portion 188. To assure accurate positioning of the lower surface of the printed circuit board 185, an insulating board 189 is placed on the modules 22 and then a metallic plate 190 is inserted in accurately located grooves in the frame 187. As the metallic plate 190 is planar, it eliminates any bowing of the printed circuit board 185. The insulating plate 189 serves two functions. It is a heat insulator so that heat loss from the printed circuit board 185 to the metallic plate 190 is reduced. Secondly, it acts as a buffer so that modules 22 are not dragged out of the printed circuit board before it is soldered. Dross removing means similar to the Teflon wiper 168 shown in FIGURE 15 can be attached to each carrier 186.

A first set of wheels 191 is rotatably mounted on one side of the frame to roll on a track member 192 while a second set of wheels 193 is adapted to roll along a track extension 194 mounted to the lower track 141. An arm 195 extends from the frame 197 and has a lip portion which is adapted to be engaged by a magnet 160 on the conveyor 20 to thereby drive the carrier along the tracks across the wave soldering station.

As the weight of the carrier 186 and the printed circuit board 185 is borne by the tracks, accurate positioning of the printed circuit board 185 is possible. In addition, the knee action of the dollies also contributes because impact between an arm 195 and a magnet 160 is partially absorbed by take-up through the knee action rather than by displacement of the frame 187 and the printed circuit board 185. When the carrier 186 reaches a position near the sprocket 135, it is transferred to the unloading chute 40.

WAVE CLEANING STATION

FIGURE 17 illustrates wave cleaning station 33 which is supplied with solvent from the pump and recovery still 34. Improved cleaning of the modulus 22 is provided by such a wave cleaner. Solvent 200 is discharged from the pump and recovery still 34 into a nozzle means 201 to form a solvent wave 202. Wave extenders 203 and 204 are disposed adjacent the opening of the nozzle so that a large turbulent solvent area exists. A portion of the solvent is diverted by another wave extender 205 which fills with solvent 200, but the solvent is nearly calm relative to the modules because it is unidirectionally flowing. At the end of the wave extender, a brush 206 extends upwardly to scrub the modules.

In operation, modulues are first subjected to the turbulent solvent wave 202 whereupon most of the flux on the modules is removed. Stubborn flux is loosened as the modules move through the solvent 200 in the wave extender 205 scrubbed off by the brush 206.

sion in the molten solder;

While various types of solder may be used with the wave soldering machine described herein, superior results have been obtained with a super refined eutectic alloy consisting of 63% tin and 37% lead. Such a solder is sold by the Alpha Metals Company under the name Vaculoy.

In summary, an automatic soldering machine constructed in accordance with this invention provides mass wave soldering in which the formation of solder icicles, solder bridges, and solder buildup is substantially eliminated. This is accomplished by a novel molten solder wave shape as recited in the appended claims having a turbulent solder portion and a contiguous drag solder pool surface. Although only one preferred embodiment of a wave soldering machine utilizing this invention is shown and described in detail, it will be obvious to those of ordinary skill in the art that various modifications can be made to the illustrated embodiment of this invention without departing from the true spirit and scope of the invention. Therefore, the appended claims are intended to cover all such equivalent variations which come within the true spirit and scope of the invention.

What is claimed as new and desired to be secured by Letters Patent of the United States is:

1. An automatic soldering machine adapted to apply solder to selected portions of a workpiece comprising:
  (a) a heated container for storing solder in a molten state;
  (b) pump means having an input adapted for immersion in the molten solder;
  (c) nozzle means for receiving molten solder from said pump means and emitting the molten solder to form a solder wave above said nozzle means;
  (d) means mounted adjacent said nozzle means for providing a continuous flow path for a portion of the molten solder after it is emitted from said nozzle means to form a drag solder pool, the level of the wave being above that of the drag solder pool and said drag solder pool having a calm surface of molten solder;
  (e) transport means for moving the selected portions of the workpiece through the solder wave to apply solder and then in partial contact with said drag solder pool to remove excess solder, solder icicles and solder bridges; and (f) dross removing means for removing dross from the solder table surface immediately prior to the workpiece traversing said solder table.

2. An automatic soldering machine as recited in claim 1 wherein said nozzle means is constituted by a pair of spaced converging plates, disposed transversely to the direction of movement of said transport means to define an inlet and an outlet, said fluid-directing means being mounted on one of said plates adjacent said outlet and being constituted by a wave forming plate having a generally horizontally extending upper surface, said upper surface defining first and second raised end portions and a central depressed portion, one of said end portions being affixed to one of said nozzle plates to form a contiguous surface.

3. An automatic soldering machine as recited in claim 2 wherein said other raised end portion and said central portion have a continuous solder flow surface therebetween, the level of said other end portion altering the flow path of a portion of the solder flowing thereacross.

4. An automatic soldering machine adapted to apply solder to a printed circuit assembly including an insulating board having a conductive coating formed thereon and a component having a lead to be soldered to the conductive coating comprising:
  (a) first heating means for initially heating the printed circuit assembly to a first temperature;
  (b) foam fluxing means for applying a foamed solder flux to the printed circuit assembly;
  (c) second heating means for elevating the printed circuit assembly to a second temperature;
  (d) wave soldering means for soldering the conductive coating and the component lead together, the second temperature being of a value to reduce the thermal shock of the printed circuit assembly when the assembly reaches said wave soldering means, said wave soldering means including:
    (i) a heated container for storing solder in a molten state;
    (ii) pump means for pumping molten solder from said container at a constant flow rate;
    (iii) nozzle means for receiving molten solder from said pump means and emitting the molten solder to form a solder wave above said nozzle means, said solder wave height being constant; and
    (iv) fluid-directing means mounted adjacent said nozzle means for providing a flow path for a portion of the molten solder after it is emitted from said nozzle means to form a solder table contiguous to the solder wave, the respective levels of the solder wave and the solder table decreasing, said fluid-directing means causing a constant height drag solder surface to form at the solder table;
  (e) heat exhaustion means for removing heat from the printed circuit assembly after removal from said wave soldering means;
  (f) cleaning means for removing residual flux from the printed circuit assembly by washing the printed circuit assembly in a solder flux solvent;
  (g) solvent removing means for removing solvent from the printed circuit assembly;
  (h) conveyor means for transporting the printed circuit assembly past said first heating means, said foam fluxing means, said second heating means, said wave soldering means, said heat exhaustion means, said cleaning means, and said solvent removing means; and
  (i) dross-removing means for removing dross from the solder table immediately prior to the workpiece traversing said solder table.

5. An automatic soldering machine as recited in claim 4 wherein said first temperature is at a level sufficient to cause the foam flux applied by said foam fluxing means to convert to a liquid on contact with the printed circuit assembly.

6. An automatic soldering machine as recited in claim 5 wherein said first temperature is approximately 80° F.

7. An automatic soldering machine as recited in claim 4 wherein said second heating means is constituted by a heating element for raising the printed circuit assembly temperature to approximately 275° F.

8. An automatic soldering machine as recited in claim 4 wherein said pump means is constituted by a motor-driven impeller pump having an improved impeller comprising first and second spaced parallel circular plates and a plurality of impeller blades connected to said plates, one of said plates being connected to a motor driving means, each of said blades extending radially from the center of said plates to form a plurality of pumping cavities defined by said plates and said blades, said cavities terminating in an apex adjacent the center of said plates, one of said plates having a plurality of apertures formed therein adjacent said apexes so that residue trapped in said cavities can exit therefrom through said apertures, said impeller being driven at a constant speed.

9. An automatic soldering machine as recited in claim 4 wherein said nozzle means is constituted by a pair of spaced converging plates disposed transversely to the direction of movement of said transport means, said plates defining an inlet and an outlet, said outlet being defined at the converged portion of said plates, said fluid-directing means being mounted on one of said plates adjacent said outlet.

10. An automatic soldering machine as recited in claim 9 wherein said fluid-directing means is constituted by a wave forming plate having a generally horizontally extending upper surface, said upper surface defining first and second raised end portions and a central depressed portion, one of said end portions being affixed to one of said nozzle plates with the upper surface thereof being contiguous to said nozzle outlet.

11. An automatic soldering machine as recited in claim 10 wherein said central portion and said second raised end portions coact to cause a calm solder table surface at a level which is spaced from the printed circuit assembly to permit said solder table to heat the solder and remove excess solder therefrom.

12. An automatic soldering machine as recited in claim 4 wherein said fluid-directing means includes means for varying the solder table relative to said wave height.

13. An automatic soldering machine as recited in claim 11 wherein said other raised end portion and said continuous solder flow surface between said central portion and said other raised end portion are tractable, additionally including adjustable support means for varying the height and configuration of said continuous solder flow path.

14. An automatic soldering machine as recited in claim 13 wherein said tractable member comprises a plurality of thin plates having a length extending transversely to the solder flow path and adjacent said plates being hinged.

15. An automatic soldering machine as recited in claim 4 especially adapted for soldering an insulating board having a plurality of apertures defined by conductive coatings wherein said wave height is above the level of the insulating board surface to be soldered, said wave being compressed as said conveyor means carries the printed circuit assembly across said wave.

16. An automatic soldering machine as recited in claim 4 wherein said heat exhaustion means is constituted by a controllable air exhaust means disposed from said wave soldering means past said cleaning means closely adjacent said transport means, said air exhaust means drawing air across the printed circuit assembly to cool the printed circuit assembly before it is subjected to said cleaning means.

17. An automatic soldering machine as recited in claim 4 wherein said cleaning means is constituted by first and second means for producing flux solvent waves, said first and second means each comprising reservoir means for containing a quantity of solvent, pump means, and nozzle means, said pump means pumping solvent from said reservoir to said nozzle means, said nozzle means being configured to form a wave having a height to completely cover the insulating board, each of said cleaning means additionally including means for extending one side of said waves to form a unidirectionally flowing solvent path having a flow direction in the same direction as the conveyor means for soaking flux on a printed circuit assembly.

18. An automatic soldering machine as recited in claim 4 wherein said conveyor means moves the printed circuit assembly past said wave soldering means in a plane which is at a constant distance from said drag solder pool surface.

19. An automatic soldering machine as recited in claim 4 wherein said conveyor means includes:
 (a) support means;
 (b) a conveyor mounted on said support means;
 (c) means for driving said conveyor mounted on said support means;
 (d) carrier means for mounting the printed circuit assembly thereon; and
 (e) coupling means for coupling said carrier to said conveyor, said carrier and conveyor coacting to move the printed circuit assembly past the wave soldering means in a plane which is a constant distance from said wave soldering means.

20. An automatic soldering machine as recited in claim 19 wherein:
 (i) said support means includes spaced, parallel track means fixedly located at a second constant height above said wave soldering means;
 (ii) said conveyor is constituted by an endless linked chain assembly;
 (iii) said coupling means comprises a plurality of dollies connected to said chain to be independently rotatable about said chain, each of said dollies having
   (a) a pair of wheels disposed to ride on said track means and mounted for rotation on each of said dollies at opposite ends thereof on a common axis of rotation,
   (b) a permanent magnet mounted to said dolly so that said chain and said magnet are on opposite sides of said axis of rotation, all the weight of said dolly resting on said wheels; and
 (iv) each of said carriers having a plate of a magnetic material adapted to span a plurality of said adjacent magnets whereby the entire weight of the carrier and the dollies hangs from said track means and the surface of the printed circuit board to be soldered remains in a constant plane as the carrier means moves past said wave soldering means.

21. An automatic soldering machine as recited in claim 20 wherein wiper means are mounted to a leading edge of said carrier to constitute said dross removal means.

22. An automatic soldering machine as recited in claim 20 having a loading station adjacent said first heating means and adapted to return said carrier means to an unloading station adjacent said loading station after said carrier means passes said solvent removing means wherein:
 (i) said support means includes upper and lower track means, each of said track means terminating adjacent said solvent removing means in an arcuate portion of a constant radius, the radius of said upper track means being less than that of said lower track means to provide overlapping concentric portions of said track means;
 (ii) guide means mounted on said support means concentric with said overlapping portions of said track means; and
 (iii) means mounted on said carrier means for coacting with said guide means to force said carrier means to disengage from all but one of said magnets, said dolly wheels transferring from said lower to said upper track means and said conveyor means then returning to said unloading station with said carrier means.

References Cited
UNITED STATES PATENTS

| | | |
|---|---|---|
| 2,770,875 | 11/1956 | Zimmerman. |
| 2,993,272 | 7/1961 | Carlzen _____ 228—37 X |
| 3,053,215 | 9/1962 | Guty _____ 228—34 |
| 3,218,193 | 11/1965 | Isaacson _____ 228—37 X |

JOHN F. CAMPBELL, Primary Examiner

VICTOR A. DI PALMA, Assistant Examiner

U.S. Cl. X.R.
29—503; 228—37